(12) United States Patent
Tachibanada et al.

(10) Patent No.: US 11,565,686 B2
(45) Date of Patent: Jan. 31, 2023

(54) HYBRID VEHICLE CONTROL APPARATUS

(71) Applicant: Honda Motor Co., Ltd., Tokyo (JP)

(72) Inventors: Yuya Tachibanada, Wako (JP); Yutaka Ishikawa, Wako (JP); Shintaro Kameda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 90 days.

(21) Appl. No.: 17/205,175

(22) Filed: Mar. 18, 2021

(65) Prior Publication Data
US 2021/0300320 A1  Sep. 30, 2021

(30) Foreign Application Priority Data

Mar. 27, 2020  (JP) .............................. JP2020-058324

(51) Int. Cl.
*B60W 20/00* (2016.01)
*B60W 10/06* (2006.01)
(Continued)

(52) U.S. Cl.
CPC ............. *B60W 20/00* (2013.01); *B60K 6/387* (2013.01); *B60W 10/026* (2013.01);
(Continued)

(58) Field of Classification Search
CPC ............ B60Y 2200/92; B60Y 2306/05; B60Y 2400/426; B60W 10/026; B60W 10/06;
(Continued)

(56) References Cited

U.S. PATENT DOCUMENTS 6,672,415 B1 * 1/2004 Tabata ................... B60L 58/34
903/910
8,182,391 B2 * 5/2012 Klemen ................. B60K 6/365
701/67
(Continued)

FOREIGN PATENT DOCUMENTS

JP  H10169771 A  6/1998
JP  2000085387 A  3/2000
(Continued)

OTHER PUBLICATIONS

Japanese Office action; Application 2020-058324; dated Nov. 9, 2021.

*Primary Examiner* — Carl C Staubach
(74) *Attorney, Agent, or Firm* — Duft & Bornsen, PC (57) ABSTRACT

A hybrid vehicle control apparatus including a torque converter temperature detector detecting a torque converter temperature, a rotor temperature detector detecting a rotor temperature, a stator temperature detector detecting a stator temperature, and an electronic control unit including a microprocessor. The microprocessor is configured to perform controlling an engine, a transmission, a lockup clutch, a motor-generator and a stator cooling device based on the torque converter temperature detected by the torque converter temperature detector, the rotor temperature detected by the rotor temperature detector and the stator temperature detected by the stator temperature detector so that the torque converter temperature is equal to or lower than a first predetermined temperature, the rotor temperature is equal to or lower than a second predetermined temperature and the stator temperature is equal to or lower than a third predetermined temperature.

5 Claims, 4 Drawing Sheets (51) Int. Cl.
*B60W 10/02* (2006.01)
*B60W 10/08* (2006.01)
*B60K 6/387* (2007.10)
*B60W 10/10* (2012.01)

(52) U.S. Cl.
CPC ............ *B60W 10/06* (2013.01); *B60W 10/08* (2013.01); *B60W 10/10* (2013.01); *B60W 2510/0291* (2013.01); *B60Y 2200/92* (2013.01); *B60Y 2306/05* (2013.01); *B60Y 2400/426* (2013.01)

(58) Field of Classification Search
CPC ...... B60W 10/08; B60W 10/10; B60W 10/30; B60W 20/00; B60W 20/15; B60W 20/50; B60W 2510/0291; B60W 2510/087; B60W 30/1843; B60K 2006/4825; B60K 6/387; B60K 6/485
See application file for complete search history.

(56) References Cited

U.S. PATENT DOCUMENTS

| | | | |
|---|---|---|---|
| 8,862,302 B1* | 10/2014 | Gabriel | B60L 15/20 |
| | | | 701/22 |
| 10,059,190 B2* | 8/2018 | Huh | B60K 6/365 |
| 2007/0202989 A1* | 8/2007 | Ortmann | B60W 10/08 |
| | | | 477/166 |
| 2010/0012408 A1* | 1/2010 | Takasaki | B60K 6/547 |
| | | | 180/65.25 |
| 2010/0087290 A1* | 4/2010 | Schoenek | B60K 6/383 |
| | | | 475/5 |
| 2014/0162839 A1* | 6/2014 | Miyazaki | B60K 6/48 |
| | | | 903/946 |

FOREIGN PATENT DOCUMENTS

| | | |
|---|---|---|
| JP | 2000227150 A | 8/2000 |
| JP | 2008187861 A | 8/2008 |

\* cited by examiner

HYBRID VEHICLE CONTROL APPARATUS

CROSS-REFERENCE TO RELATED APPLICATION

This application is based upon and claims the benefit of priority from Japanese Patent Application No. 2020-058324 filed on Mar. 27, 2020, the content of which is incorporated herein by reference.

BACKGROUND OF THE INVENTION

Field of the Invention

This invention relates to a hybrid vehicle control apparatus controlling a hybrid vehicle.

Description of the Related Art

Conventionally, there is a known apparatus of this type in which a motor generator is coupled to an input member of a torque converter disposed between an engine and a transmission. Such an apparatus is described, for example, in Japanese Unexamined Patent Publication No. 2000-85387 (JP2000-085387A).

However, when the motor generator is coupled to a member on the input side of the torque converter, as in the apparatus described in JP2000-085387A, heat of the torque converter is easily transferred to the motor generator, and thus causing the temperature of the motor generator to rise.

SUMMARY OF THE INVENTION

An aspect of the present invention is a hybrid vehicle control apparatus controlling a hybrid vehicle. The hybrid vehicle includes an engine, a torque converter having a pump impeller to which a torque output from an output shaft of the engine is input and a turbine runner disposed so as to face the pump impeller, a transmission changing a speed of a rotation input from the torque converter, a motor-generator having a rotor integrally connected to the pump impeller and a stator disposed around the rotor, a lockup clutch connecting the output shaft of the engine and an input shaft of the transmission or disconnecting the input shaft from the output shaft, and a stator cooling device cooling the stator. The hybrid vehicle control apparatus includes: a torque converter temperature detector configured to detect a temperature of the torque converter; a rotor temperature detector configured to detect a temperature of the rotor; a stator temperature detector configured to detect a temperature of the stator; and an electronic control unit including a microprocessor and a memory connected to the microprocessor. The microprocessor is configured to perform controlling the engine, the transmission, the lockup clutch, the motor-generator and the stator cooling device based on the temperature of the torque converter detected by the torque converter temperature detector, the temperature of the rotor detected by the rotor temperature detector and the temperature of the stator detected by the stator temperature detector so that the temperature of the torque converter is equal to or lower than a first predetermined temperature, the temperature of the rotor is equal to or lower than a second predetermined temperature and the temperature of the stator is equal to or lower than a third predetermined temperature.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
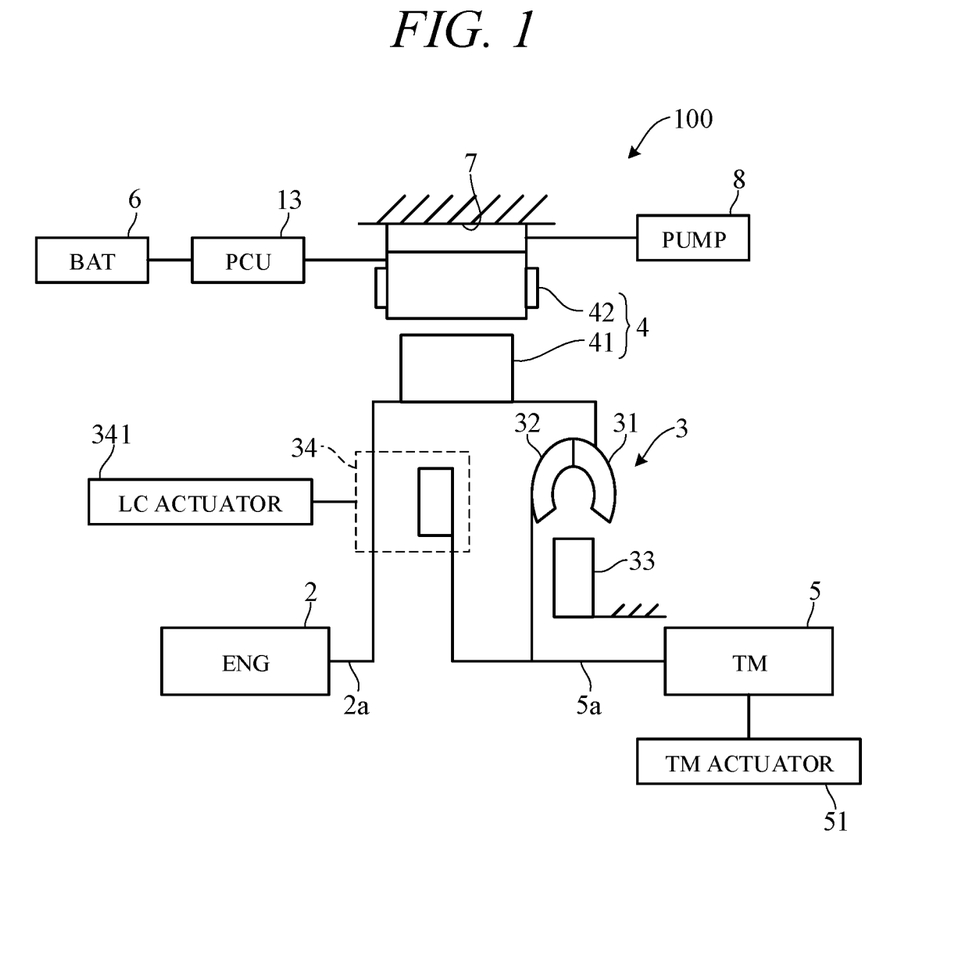
FIG. 1 is a drawing schematically showing a part of a travel drive system of a hybrid vehicle to which a hybrid vehicle control apparatus according to an embodiment of the present invention is applied.

Hereafter, an embodiment of the present invention is explained with reference to FIGS. 1 to 4. A control apparatus according to an embodiment of the present invention is applied to hybrid vehicles that include an engine and a motor-generator as travel drive sources and travel by the drive force of one or both of the engine and motor-generator. FIG. 1 is a drawing schematically showing a part of the travel drive system of a hybrid vehicle to which the control apparatus according to the embodiment of the present invention is applied. As shown in FIG. 1, a hybrid vehicle 100 controlled by a control apparatus 1 according to the present embodiment includes an engine (ENG) 2, a torque converter 3, a motor-generator 4, and a transmission (TM) 5.

The engine 2 is an internal combustion engine (e.g., a gasoline engine) that mixes intake air supplied through a throttle valve and fuel injected from an injector at an appropriate ratio, ignites the mixture using an ignition plug or the like to burn it, and thus generates a rotation force. The engine 2 may be any type of engine, such as a diesel engine, in place of a gasoline engine. The opening of the throttle valve, the amount of fuel injected from the injector (injection timing, injection time), the ignition timing, and the like are controlled by the control apparatus 1 (see FIG. 2).

A torque outputted from the engine 2 is inputted to the torque converter 3. The torque converter 3 includes a pump impeller 31 connected to the output shaft (crankshaft) 2a of the engine 2, a turbine runner 32 disposed so as to face the pump impeller 31, a stator 33 disposed between the pump impeller 31 and turbine runner 32, and a lockup clutch (LC) 34 that connects the output shaft 2a of the engine 2 and the input shaft 5a of the transmission 5.

When the pump impeller 31 is rotated by rotation of the output shaft 2a of the engine 2 with the lockup clutch 34 disconnected, hydraulic oil pushed out of the pump impeller 31 flows into the turbine runner 32, drives the turbine runner 32, then passes through the stator 33, and flows back into the pump impeller 31. Thus, the rotation of the output shaft 2a of the engine 2 is reduced in speed and increased in torque and inputted to the input shaft 5a of the transmission 5.

The lockup clutch 34 is activated by a lockup clutch actuator (hereafter also referred to as the "LC actuator") 341, and the activation of the LC actuator 341 is controlled by the control apparatus 1. By activating the LC actuator 341 and thus engaging the lockup clutch 34, the output shaft 2a of the engine 2 and the input shaft 5a of the transmission 5 are directly coupled to each other. Thus, the torque of the engine 2 is directly inputted to the input shaft 5a of the transmission 5 through the lockup clutch 34.

The motor-generator 4 includes a rotor 41 integrally connected to the pump impeller 31 and a stator 42 disposed around the rotor 41 and functions as a motor and a generator. Power supplied to the stator 42 from a battery (BAT) 6 is controlled by a power control unit (PCU) 13. When power is supplied from the battery 6 to the coil of the stator 42, the rotor 41 is driven. At this time, the motor-generator 4 serves as a motor. On the other hand, when the rotor 41 is driven by an external force, the motor-generator 4 generates power, which is then accumulated in the battery 6 through the power control unit 13. At this time, the motor-generator 4 serves as a generator.

The rotor 41 is disposed on the radial outside of the lockup clutch 34. A water jacket 7 is disposed around the stator 42, and the stator 42 is cooled by cooling water (cooling medium) flowing through the water jacket 7. A pump (stator cooling device) 8 is connected to the water jacket 7, and cooling water cooled by a radiator or the like is fed into the water jacket 7 by the pump 8. The pump 8 is a motor pump driven by power from the battery 6. The drive of the pump 8 is controlled by the control apparatus 1 and thus the flow rate of cooling water fed into the water jacket 7 is controlled.

The transmission 5 is disposed on a power transmission path between the torque converter 3 and an axle. The transmission 5 changes the speed of rotation received from the torque converter 3, converts the torque received from the torque converter 3, and outputs the resulting rotation and torque. The transmission 5 is configured such that the speed ratio is changed by a transmission actuator (hereafter referred to as the "TM actuator") 51. The activation of the TM actuator 51 is controlled by the control apparatus 1. The torque outputted from the transmission 5 is transmitted to drive wheels through the axle and thus causes the hybrid vehicle to travel. In the hybrid vehicle thus configured, the rotor 41 of the motor-generator 4 is integrally connected to the pump impeller 31 of the torque converter 3. For this reason, the heat of the torque converter 3 is easily transmitted to the motor-generator 4 and thus the temperature of the motor-generator 4 easily increases. The increase in the temperature of the motor-generator 4 may disable the motor-generator 4 and thus make control using the motor-generator 4 unavailable. For this reason, the control apparatus 1 according to the present embodiment is configured as follows so that the motor-generator 4 which has increased in temperature is efficiently cooled.

Figure 2:
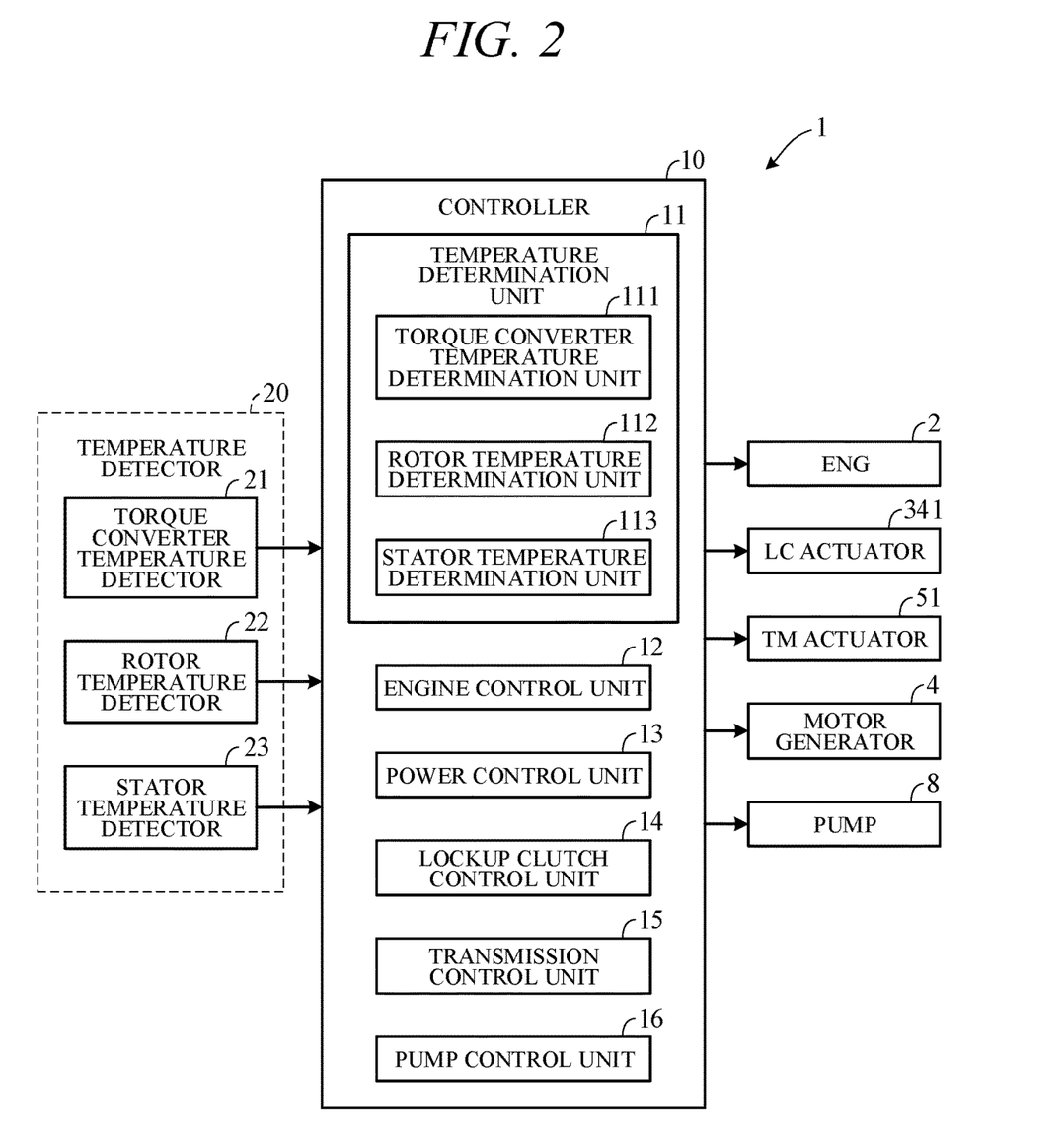
FIG. 2 is a block diagram showing a configuration of main components of the hybrid vehicle control apparatus according to the embodiment of the invention.

FIG. 2 is a block diagram schematically showing the configuration of main components of the control apparatus 1 for hybrid vehicles according to the embodiment of the present invention. As shown in FIG. 2, the control apparatus 1 includes a controller 10 and a temperature detector 20. The temperature detector 20 includes a torque converter temperature detector 21 that detects the temperature of the torque converter 3, a rotor temperature detector 22 that detects the temperature of the rotor 41, and a stator temperature detector 23 that detects the temperature of the stator 42. The torque converter temperature detector 21 consists of a sensor that detects the temperature of hydraulic oil circulating through the torque converter 3. The stator temperature detector 23 consists of a sensor that detects the temperature of the stator 42 or a sensor that detects the temperature of cooling water flowing through the water jacket 7.

The rotor temperature detector 22 calculates the estimated temperature of the rotor 41 on the basis of the temperature of the torque converter 3 detected by the torque converter temperature detector 21 and the temperature of the stator 42 detected by the stator temperature detector 23. For example, the rotor temperature detector 22 estimates the temperature of the rotor 41 using heat received by conduction from a portion in contact with the torque converter 3, heat received by fluid transfer from the coil of the stator 42 through the air, and a previously calculated coefficient. The previously calculated coefficient is calculated on the basis of, for example, an experimental value previously obtained in an experiment and a theoretical value. Note that the rotor temperature detector 22 may consist of a sensor that detects the temperature of the rotor 41.

The controller 10 includes a computer including a CPU, RAM, ROM, other peripheral circuits, and the like. The controller 10 performs various types of control on the basis of signals from the temperature detector 20 and the like in accordance with a program previously stored in the memory. More specifically, the controller 10 controls the engine (ECG) 2, motor-generator (MG) 4, LC actuator 341, TM actuator 51, and pump 8 so that the temperature of the torque converter 3 detected by the torque converter temperature detector 21 becomes equal to or lower than a first predetermined temperature, the temperature of the rotor 41 detected by the rotor temperature detector 22 becomes equal to or lower than a second predetermined temperature, and the temperature of the stator 42 detected by the stator temperature detector 23 becomes equal to or lower than a third predetermined temperature.

The controller 10 includes, as functional elements, a temperature determination unit 11, an engine control unit 12, a lockup clutch control unit 14, a transmission control unit 15, and a pump control unit 16. The temperature determination unit 11 includes a torque converter temperature determination unit 111, a rotor temperature determination unit 112, and a stator temperature determination unit 113. The controller 10 also includes the power control unit 13 (FIG. 1).

The torque converter temperature determination unit 111 determines whether the temperature detected by the torque converter temperature detector 21 exceeds the first predetermined temperature. The first predetermined temperature is the temperature of the torque converter 3 at which the motor-generator 4 may increase in temperature due to heat conduction from a portion in contact with the rotor 41 to the rotor 41 and thus may become uncontrollable. For example, the first predetermined temperature is about 200° C.

The rotor temperature determination unit 112 determines whether the temperature detected by the rotor temperature detector 22 exceeds the second predetermined temperature. The second predetermined temperature is the temperature of the rotor 41 at which the motor-generator 4 may become uncontrollable or the like. For example, the second predetermined temperature is about 150° C.

The stator temperature determination unit 113 determines whether the temperature detected by the stator temperature detector 23 exceeds the third predetermined temperature. The third predetermined temperature is the temperature of the stator 42 at which the motor-generator 4 may become uncontrollable. For example, the third predetermined temperature is about 200° C.

The engine control unit 12 controls the speed and torque of the engine 2 by controlling the opening of the throttle valve, the amount of fuel injected from the injector (injection timing, injection time), the ignition timing, and the like. The power control unit 13 includes an inverter. The inverter controls power supplied from the battery 6 and thus controls the output torque and regenerative torque of the motor-generator 4.

The lockup clutch control unit 14 controls the lockup clutch 34 by controlling the activation of the LC actuator 341. The transmission control unit 15 controls the speed ratio of the transmission 5 by controlling the activation of the TM actuator 51. The pump control unit 16 controls the flow rate of cooling water fed into the water jacket 7 by controlling the drive of the pump 8.

Figure 3:
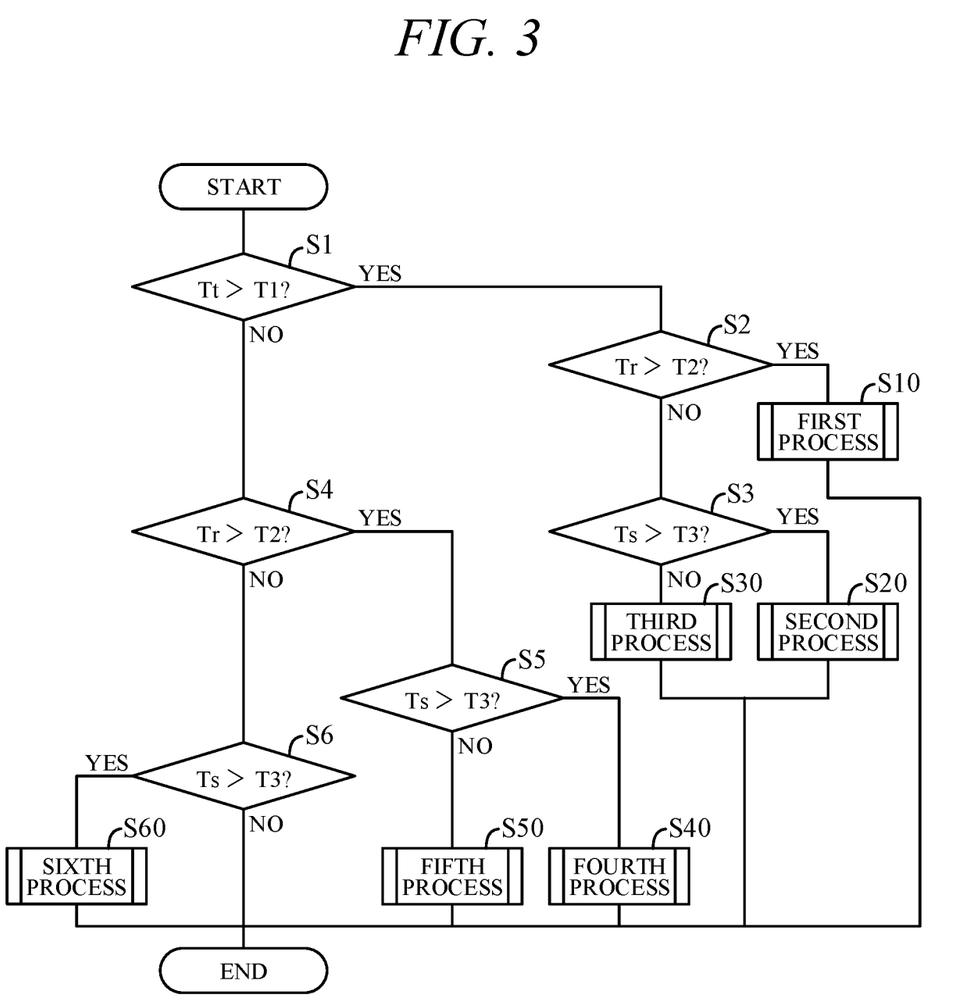
FIG. 3 is a flowchart showing an example of processing by a controller of FIG. 2.

FIG. 3 is a flowchart showing an example of a process performed by the control apparatus 1 in accordance with a program previously stored in the memory. For example, the process shown in this flowchart is started when the engine 2 is started, and repeated in a predetermined cycle.

First, in S1 (S: process step), the torque converter temperature determination unit 111 determines whether the temperature of the torque converter 3 (torque converter temperature Tt) detected by the torque converter temperature detector 21 exceeds the first predetermined temperature T1. If the determination in S1 is YES, the process proceeds to S2 and the rotor temperature determination unit 112 determines whether the estimated temperature of the rotor 41 (rotor temperature Tr) calculated by the rotor temperature detector 22 exceeds the second predetermined temperature T2. If the determination in S2 is YES, the process proceeds to S10 and the control apparatus 1 performs a first process.

On the other hand, if the determination in S2 is NO, the process proceeds to S3 and the stator temperature determination unit 113 determines whether the temperature of the stator 42 (stator temperature Ts) detected by the stator temperature detector 23 exceeds the third predetermined temperature T3. If the determination in S3 is YES, the process proceeds to S20 and the control apparatus 1 performs a second process. If the determination in S3 is NO, the process proceeds to S30 and the control apparatus 1 performs a third process.

If the determination in S1 is NO, the process proceeds to S4 and the rotor temperature determination unit 112 determines whether the rotor temperature Tr exceeds the second predetermined temperature T2, as in S2. If the determination in S4 is YES, the process proceeds to S5 and the stator temperature determination unit 113 determines whether the stator temperature Ts exceeds the third predetermined temperature T3, as in S3. If the determination in S5 is YES, the process proceeds to S40 and the control apparatus 1 performs a fourth process. On the other hand, if the determination in S5 is NO, the process proceeds to S50 and the control apparatus 1 performs a fifth process.

If the determination in S4 is NO, the process proceeds to S6 and the stator temperature determination unit 113 determines whether the stator temperature Ts exceeds the third predetermined temperature T3, as in S3. If the determination in S6 is YES, the process proceeds to S60 and the control apparatus 1 performs a sixth process. If the determination in S6 is NO, the control apparatus 1 ends the process.

Figure 4:
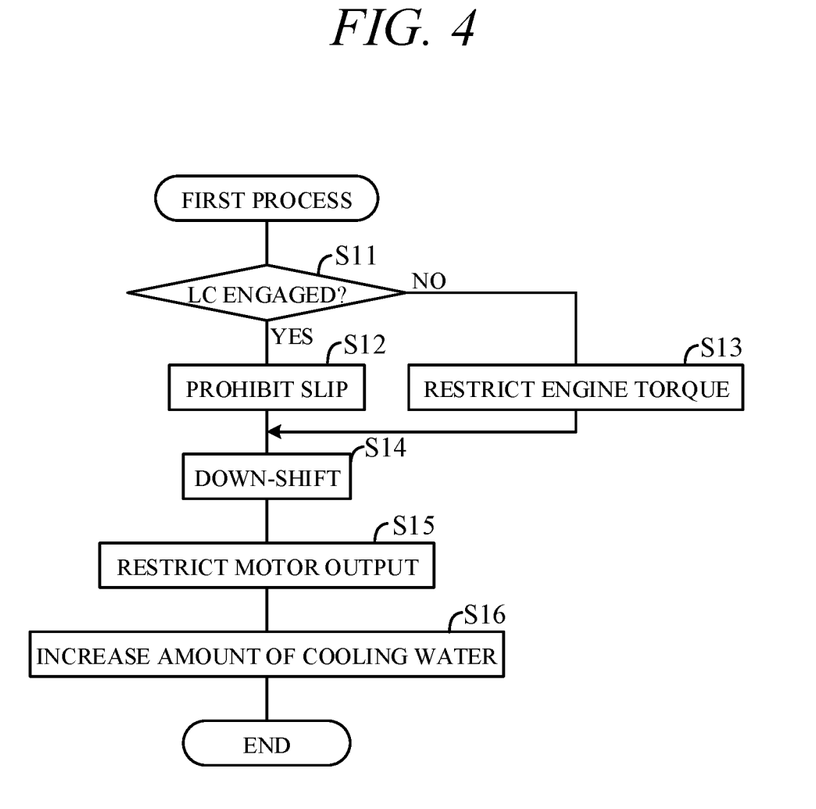
FIG. 4 is a flowchart specifically showing an example of a first process in FIG. 3.

FIG. 4 is a flowchart specifically showing an example of the first process of S10 in FIG. 3. The first process is a process performed when it is determined that the torque converter temperature Tt is higher than the first predetermined temperature T1 and the rotor temperature Tr is higher than the second predetermined temperature T2. The first process is performed, whether or not the stator temperature Ts exceeds the third predetermined temperature T3. That is, the first process is a process performed when it is determined that the torque converter temperature Tt and rotor temperature Tr are high temperatures or if it is determined that the torque converter temperature Tt, rotor temperature Tr, and stator temperature Ts are high temperatures.

As shown in FIG. 4, first, in S11, it is determined whether the lockup clutch 34 is connected (engaged). If the determination in S11 is YES, the process proceeds to S12 and the lockup clutch control unit 14 controls the LC actuator 341 so that the lockup clutch 34 is connected while the slip of the lockup clutch 34 is prohibited. By prohibiting the slip in the lockup clutch ON area as described above, heating of the torque converter 3 is suppressed and thus the torque converter temperature Tt is reduced. On the other hand, if the determination in S11 is No, the process proceeds to S13 and the engine control unit 12 controls the engine 2 so that the torque of the engine 2 becomes equal to or smaller than a predetermined torque. The predetermined torque is, for example, the torque of the engine 2 at which heating of the torque converter 3 can be suppressed. By restricting the engine torque in the lockup clutch OFF area as described above, heating of the torque converter 3 is suppressed and thus the torque converter temperature Tt is reduced.

Then, in S14, the transmission control unit 15 controls the TM actuator 51 so that the gear position (gear shift stage) of the transmission 5 is changed to a low position, that is, the transmission 5 is down-shifted. Thus, the engine RPM is increased and thus heat-air exchange is promoted. This results in favorable heat radiation from the rotor 41 and thus a reduction in the rotor temperature Tr. Then, in S15, the power control unit 13 controls power supplied to the stator 42 so that the output of the motor-generator 4 becomes equal to or smaller than a predetermined value. The "output equal to or smaller than the predetermined value" refers to, for example, output such that the amount of heat generated by the motor-generator 4 is suppressed to the predetermined value or less. Then, in S16, the pump control unit 16 controls the pump 8 so that the amount of cooling water fed into the water jacket 7 is increased, thereby ending the process. By suppressing heating of the motor-generator 4 and increasing the amount of cooling water as described above, the stator temperature Ts is reduced. The order of the steps of the first process is not limited to that described above.

Although not shown, the second to sixth processes are as follows. The second process is a process performed when it is determined that the torque converter temperature Tt is higher than the first predetermined temperature T1, the rotor temperature Tr is lower than the second predetermined temperature T2, and the stator temperature Ts is higher than the third predetermined temperature. That is, the second process is a process performed when it is determined that the torque converter temperature Tt and stator temperature Ts are high temperatures. In the second process, it is determined whether the lockup clutch 34 is engaged, as in the S12 and S13 of FIG. 4. If it is determined that the lockup clutch 34 is engaged, the LC actuator 341 is controlled so that the lockup clutch 34 is engaged while the slip of the lockup clutch 34 is prohibited. On the other hand, if it is determined that the lockup clutch 34 is disengaged, the engine 2 is controlled so that the torque of the engine 2 becomes equal to or smaller than the predetermined torque. Also, as in S15 and S16 of FIG. 4, power supplied to the stator 42 is controlled so that the output of the motor-generator 4 becomes equal to or smaller than the predetermined value, and the pump 8 is controlled so that the amount of cooling water fed into the water jacket 7 is increased.

The third process is a process performed when it is determined that the torque converter temperature Tt is higher than the first predetermined temperature T1, the rotor temperature Tr is lower than the second predetermined temperature T2, and the stator temperature Ts is lower than the third predetermined temperature T3. That is, the third process is a process performed when it is determined that the torque converter temperature Tt alone is a high temperature. In the third process, it is determined whether the lockup clutch 34 is engaged, as in the S12 and S13 of FIG. 4. If it is determined that the lockup clutch 34 is engaged, the LC actuator 341 is controlled so that the lockup clutch 34 is engaged while the slip of the lockup clutch 34 is prohibited. On the other hand, if it is determined that the lockup clutch 34 is disconnected (disengaged), the engine 2 is controlled so that the torque of the engine 2 becomes equal to or smaller than the predetermined torque.

The fourth process is a process performed when it is determined that the torque converter temperature Tt is lower than the first predetermined temperature T1, the rotor temperature Tr is higher than the second predetermined temperature T2, and the stator temperature Ts is higher than the third predetermined temperature T3. That is, the fourth process is a process performed when it is determined that the rotor temperature Tr and stator temperature Ts are high. In the fourth process, the rotor 41 and stator 42 are cooled to the extent that the torque converter temperature Tt does not exceed the first predetermined temperature T1. Specifically, the lockup clutch 34 is disengaged, and the engine 2 is controlled so that the engine speed becomes equal to or higher than a predetermined speed. Thus, heat radiation from the rotor 41 to the air is promoted, resulting in a reduction in the rotor temperature Tr. Also, in the fourth process, power supplied to the stator 42 is controlled so that the output of the motor-generator 4 becomes equal to or smaller than the predetermined value, and the pump 8 is controlled so that the amount of cooling water fed into the water jacket 7 is increased.

The fifth process is a process performed when it is determined that the torque converter temperature Tt is lower than the first predetermined temperature T1, the rotor temperature Tr is higher than the second predetermined temperature T2, and the stator temperature Ts is lower than the third predetermined temperature T3. That is, the fifth process is a process performed when it is determined that the rotor temperature Tr alone is a high temperature. In the fifth process, as in the fourth process, the lockup clutch 34 is disengaged, and the engine 2 is controlled so that the engine speed becomes equal to or higher than the predetermined speed.

The sixth process is a process performed when it is determined that the torque converter temperature Tt is lower than the first predetermined temperature T1, the rotor temperature Tr is lower than the second predetermined temperature T2, and the stator temperature Ts is higher than the third predetermined temperature T3. That is, the sixth process is a process performed when it is determined that the stator temperature Ts alone is a high temperature. In the sixth process, the stator 42 is cooled to the extent that the torque converter temperature Tt does not exceed the first predetermined temperature T1. Specifically, power supplied to the stator 42 is controlled so that the output of the motor-generator 4 becomes equal to or smaller than the predetermined value, and the pump 8 is controlled so that the amount of cooling water fed into the water jacket 7 is increased. Also, the TM actuator 51 is controlled so that the gear position is changed to a gear position in which the engine efficiency is maximized in a map of brake specific fuel consumption (BSFC).

The present embodiment can achieve advantages and effects such as the following:

(1) The hybrid vehicle control apparatus 1 according to the embodiment is configured to control a hybrid vehicle, and the hybrid vehicle includes the engine 2, the torque converter 3 having the pump impeller 31 to which torque output from the output shaft 2a of the engine 2 is input and the turbine runner 32 disposed so as to face the pump impeller 31, the transmission 5 changing the speed of rotation input from the torque converter 3, the motor-generator 4 having the rotor 4 integrally connected to the pump impeller 31 and the stator 42 disposed around the rotor 41, the lockup clutch 34 connecting the output shaft 2a and the input shaft 5a of the transmission 5, and the pump 8 discharging the cooling medium for cooling the stator 42 (FIG. 1). The control apparatus 1 includes: the torque converter temperature detector 21 that detects the temperature Tt of the torque converter 3; the rotor temperature detector 22 that detects the temperature Tr of the rotor 41; the stator temperature detector 23 that detects the temperature Ts of the stator 42; and the controller 10 controlling the engine 2, the transmission 5, the lockup clutch 34, the motor-generator 4 and the pump 8 based on the temperature Tt of the torque converter 3 detected by the torque converter temperature detector 21, the temperature Tr of the rotor 41 detected by the rotor temperature detector 22 and the temperature Ts of the stator 42 detected by the stator temperature detector 23 so that the temperature Tt of the torque converter 3 is equal to or lower than the first predetermined temperature T1, the temperature Tr of the rotor 41 is equal to or lower than the second predetermined temperature T2 and the temperature Ts of the stator 42 is equal to or lower than the third predetermined temperature T3 (FIGS. 2 and 3).

Therefore, in the case that the rotor 41 of the motor-generator 4 is integrally connected to the pump impeller 31 of the torque converter 3, the motor-generator 4 can be efficiently cooled. As a result, the control apparatus can prevent an occurrence of inconvenience that the motor-generator 4 is unavailable or a control using the motor-generator 4 is unavailable due to temperature increase of the motor-generator 4.

(2) The controller 10 includes the torque converter temperature determination unit 11 that determines whether the temperature Tt of the torque converter 3 detected by the torque converter temperature detector 21 is higher than the first predetermined temperature T1, and controls the lockup clutch 34 and the engine 2 so that the lockup clutch 34 is connected while the slip of the lockup clutch 34 is prohibited, or the lockup clutch 34 is disconnected and the torque from the engine 2 is equal to or smaller than the predetermined torque, when it is determined by the torque converter temperature determination unit 111 that the temperature Tt of the torque converter 3 is higher than the first predetermined temperature T1 (FIGS. 2 and 4).

The types of engagement of the lockup clutch 34 include complete engagement, in which the slip of the lockup clutch 34 is prohibited, and slight engagement, in which the lockup clutch 34 is engaged while being caused to slip. In the case of slight engagement, the torque converter 3 slides and thus causes heat loss, and the lockup clutch 34 slips and thus causes heat loss as well, resulting in an increase in the torque converter temperature. For this reason, when the torque converter temperature Tt is high, the control apparatus 1 prohibits the slip of the lockup clutch 34 and thus is able to reduce the heat loss and to suppress the increase in the torque converter temperature. In other words, the control apparatus 1 is able to reduce the torque converter temperature to an extent corresponding to the reduction in the heat loss. When the torque converter 3 is functioning due to disengagement of the lockup clutch 34, the control apparatus 1 is able to restrict the torque of the engine 2 and thus to suppress the function of the torque converter 3 to suppress heating of the torque converter 3. That is, when the torque converter temperature Tt exceeds the first predetermined temperature T1 and becomes a high temperature, the control apparatus 1 is able to reduce the torque converter temperature Tt and thus to prevent the temperature of the motor-generator 4 from increasing due to such as heat received from the portion in contact with the torque converter 3. The control apparatus 1 is also able to reduce the temperature of the motor-generator 4 using heat conduction from the motor-generator 4 to the torque converter 3.

(3) The controller 101 includes the rotor temperature determination unit 112 that determines whether the temperature Tr of the rotor 41 detected by the rotor temperature detector 22 is higher than the second predetermined temperature T2, and controls the transmission 5, the pump 8 and the power control unit 13 so that when it is determined by the rotor temperature determination unit 112 that the temperature Tr of the rotor 41 is higher than the second predetermined temperature T2, the transmission 5 is down-shifted (increase of the speed ratio), the flow rate of the cooling medium increases and the output of the motor-generator 4 is equal to or smaller than the predetermined value (FIGS. 2 and 4).

Since the transmission 5 is down-shifted (the speed ratio is increased), the engine speed is increased and the rotor 41 integrally connected to the rotating pump impeller 31 exchanges heat with the air and thus is cooled. The stator 42 is cooled by increasing the flow rate of cooling water, and the temperature of the rotor 41 is reduced by heat transfer to the cooled stator 42 through the air. By reducing the output of the motor-generator 4 to the predetermined value or less, the control apparatus 1 is able to reduce unwanted heating of the motor-generator 4. Therefore, it is possible to efficiently reduce the torque converter temperature Tt, as well as the rotor temperature Tr and stator temperature Ts.

(4) The controller 10 includes the stator temperature determination unit 113 that determines whether the temperature Ts of the stator 42 detected by the stator temperature detector 23 is higher than the third predetermined temperature T3, in addition to the torque converter temperature determination unit 111, and further controls the pump 8 and the power control unit 13 so that the flow rate of the cooling water increases and the output of the motor-generator 4 is equal to or smaller than the predetermined value when it is determined by the stator temperature determination unit 113 that the temperature Ts of the stator 42 is higher than the third predetermined temperature T3 (FIGS. 2 and 4). Therefore, it is possible to efficiently reduce the torque converter temperature Tt, as well as the stator temperature Ts.

(5) The controller 10 controls the lockup clutch 34 so that the lockup clutch 34 is disconnected when it is determined by the torque converter temperature determination unit 111 that the temperature Tt of the torque converter 3 is equal to or lower than the first predetermined temperature T1 and it is determined by the rotor temperature determination unit 112 that the temperature Tr of the rotor 41 is higher than the second predetermined temperature T2. By increasing the engine speed with the lockup clutch 34 disconnected, the heat exchange between the rotor 41 integrally connected to the pump impeller 31 and air is promoted. As a result, it is possible to efficiently reduce the rotor temperature Tr.

(6) The controller 10 further controls the pump 8 and the power control unit 13 in addition to the above processing (the processing in (5)) so that the flow rate of the cooling water increases and the output of the motor-generator 4 is equal to or smaller than the predetermined value, when it is determined by the torque converter temperature determination unit 111 that the temperature Tt of the torque converter 3 is equal to or lower than the first predetermined temperature T1, it is determined by the rotor temperature determination unit 112 that the temperature Tr of the rotor 41 is higher than the second predetermined temperature T2 and it is determined by the stator temperature determination unit 113 that the temperature Ts of the stator 42 is higher than the third predetermined temperature T3. As a result, it is possible to efficiently reduce the rotor temperature Tr and the stator temperature Ts.

(7) The controller 10 controls the pump 8, the motor-generator 4 and the transmission 5 so that the flow rate of the cooling water increases, the output of the motor-generator 4 is equal to or smaller than the predetermined value, and the gear shift stage of the transmission 5 changes to a target gear shift stage in which an engine efficiency is maximized, when it is determined by the torque converter temperature determination unit 111 that the temperature Tt of the torque converter 3 is equal to or lower than the first predetermined temperature T1, it is determined by the rotor temperature determination unit 112 that the temperature Tr of the rotor 41 is equal to or lower than the second predetermined temperature T2 and it is determined by the stator temperature determination unit 113 that the temperature Ts of the stator 42 is higher than the third predetermined temperature T3. The sixth process aims to reduce the stator temperature Ts. Accordingly, the control apparatus 1 changes the gear position to a gear position having high engine efficiency, regardless of the engine speed and thus is able to reduce heating of the entire system to efficiently reduce the stator temperature Ts.

While, in the above embodiment, the torque converter temperature detector 21 detects the temperature of hydraulic oil of the torque converter 3 as the torque converter temperature Tt, the torque converter temperature is not limited to the temperature of hydraulic oil and may be the temperature of a member (e.g., the pump impeller 31) having a correlation with the torque converter temperature.

While, in the above embodiment, the rotor temperature detector 22 detects (calculates) the rotor temperature Tr (estimated temperature) by using heat received from the torque converter 3 and the stator 42 and the coefficient, the rotor temperature is not limited to this and may be the temperature of a member (e.g., the magnet embedded in the rotor 41) having a correlation with the rotor temperature.

While, in the above embodiment, the stator temperature detector 23 detects the temperature of the stator coil or the temperature of the cooling water in the water jacket 7 as the stator temperature Ts, the stator temperature is not limited to this and may be calculated based the temperature of a member having a correlation with the stator temperature.

The present invention can be configured as a hybrid vehicle control method including: detecting a temperature Tt of the torque converter 3; detecting a temperature Tr of the rotor 41; detecting a temperature Ts of the stator 42; and controlling the engine 2, the transmission 5, the lockup clutch 34, the motor-generator 4 and the stator cooling device (the motor 8) based on the detected temperature Tt of the torque converter 3, the detected temperature Tr of the rotor 41 and the detected temperature Ts of the stator 42 so that the temperature Tt of the torque converter 3 is equal to or lower than a first predetermined temperature T1, the temperature Tr of the rotor 41 is equal to or lower than a second predetermined temperature T2 and the temperature of the stator 42 is equal to or lower than a third predetermined temperature T3.

The above embodiment can be combined as desired with one or more of the above modifications. The modifications can also be combined with one another.

According to the present invention, it is possible to efficiently reduce a temperature increase of a motor-generator.

Above, while the present invention has been described with reference to the preferred embodiments thereof, it will be understood, by those skilled in the art, that various changes and modifications may be made thereto without departing from the scope of the appended claims.

What is claimed is:

1. A hybrid vehicle control apparatus controlling a hybrid vehicle, the hybrid vehicle including an engine, a torque converter having a pump impeller to which a torque output from an output shaft of the engine is input and a turbine runner disposed so as to face the pump impeller, a transmission changing a speed of a rotation input from the torque converter, a motor-generator having a rotor integrally connected to the pump impeller and a stator disposed around the rotor, a lockup clutch connecting the output shaft of the engine and an input shaft of the transmission or disconnecting the input shaft from the output shaft, and a stator cooling device cooling the stator,
the hybrid vehicle control apparatus comprising:
a torque converter temperature detector configured to detect a temperature of the torque converter;
a rotor temperature detector configured to detect a temperature of the rotor;
a stator temperature detector configured to detect a temperature of the stator; and
an electronic control unit including a microprocessor and a memory connected to the microprocessor, wherein
the microprocessor is configured to perform:
controlling the engine, the transmission, the lockup clutch, the motor-generator and the stator cooling device based on the temperature of the torque converter detected by the torque converter temperature detector, the temperature of the rotor detected by the rotor temperature detector and the temperature of the stator detected by the stator temperature detector so that the temperature of the torque converter is equal to or lower than a first predetermined temperature, the temperature of the rotor is equal to or lower than a second predetermined temperature and the temperature of the stator is equal to or lower than a third predetermined temperature;
determining whether the temperature of the torque converter detected by the torque converter temperature detector is higher than the first predetermined temperature;
determining whether the temperature of the rotor detected by the rotor temperature detector is higher than the second predetermined temperature; and
determining whether the temperature of the stator detected by the stator temperature detector is higher than the third predetermined temperature, and wherein
the microprocessor is configured to perform
the controlling including controlling the lockup clutch so that when it is determined that the temperature of the torque converter is equal to or lower than the first predetermined temperature and it is determined that the temperature of the rotor is higher than the second predetermined temperature, the lockup clutch is disconnected.

2. The hybrid vehicle control apparatus according to claim 1, wherein
the stator cooling device includes a pump circulating a cooling medium, and
the microprocessor is configured to perform
the controlling including controlling the pump and motor-generator so that when it is determined that the temperature of the stator is higher than the third predetermined temperature, a flow rate of the cooling medium increases and an output of the motor-generator is equal to or smaller than a predetermined value.

3. The hybrid vehicle control apparatus according to claim 1, wherein
the rotor is disposed on a radial outside of the lockup clutch.

4. A hybrid vehicle control apparatus controlling a hybrid vehicle, the hybrid vehicle including an engine, a torque converter having a pump impeller to which a torque output from an output shaft of the engine is input and a turbine runner disposed so as to face the pump impeller, a transmission changing a speed of a rotation input from the torque converter, a motor-generator having a rotor integrally connected to the pump impeller and a stator disposed around the rotor, a lockup clutch connecting the output shaft of the engine and an input shaft of the transmission or disconnecting the input shaft from the output shaft, and a stator cooling device cooling the stator,
the hybrid vehicle control apparatus comprising:
a torque converter temperature detector configured to detect a temperature of the torque converter;
a rotor temperature detector configured to detect a temperature of the rotor;
a stator temperature detector configured to detect a temperature of the stator; and
an electronic control unit including a microprocessor and a memory connected to the microprocessor, wherein
the microprocessor is configured to perform:
controlling the engine, the transmission, the lockup clutch, the motor-generator and the stator cooling device based on the temperature of the torque converter detected by the torque converter temperature detector, the temperature of the rotor detected by the rotor temperature detector and the temperature of the stator detected by the stator temperature detector so that the temperature of the torque converter is equal to or lower than a first predetermined temperature, the temperature of the rotor is equal to or lower than a second predetermined temperature and the temperature of the stator is equal to or lower than a third predetermined temperature;
determining whether the temperature of the torque converter detected by the torque converter temperature detector is higher than the first predetermined temperature;
determining whether the temperature of the rotor detected by the rotor temperature detector is higher than the second predetermined temperature; and
determining whether the temperature of the stator detected by the stator temperature detector is higher than the third predetermined temperature,
the stator cooling device includes a pump circulating a cooling medium, and
the microprocessor is configured to perform the controlling including controlling the pump, the motor-generator and the transmission so that when it is determined that the temperature of the torque converter is equal to or lower than the first predetermined temperature, it is determined that the temperature of the rotor is equal to or lower than the second predetermined temperature and it is determined that the temperature of the stator is higher than the third predetermined temperature, a flow rate of the cooling medium increases, an output of the motor-generator is equal to or smaller than a predetermined value, and a gear shift stage of the transmission changes to a target gear shift stage in which an engine efficiency is maximized.

5. A hybrid vehicle control method controlling a hybrid vehicle, the hybrid vehicle including an engine, a torque converter having a pump impeller to which a torque output from an output shaft of the engine is input and a turbine runner disposed so as to face the pump impeller, a transmission changing a speed of a rotation input from the torque converter, a motor-generator having a rotor integrally connected to the pump impeller and a stator disposed around the rotor, a lockup clutch connecting the output shaft of the engine and an input shaft of the transmission or disconnecting the input shaft from the output shaft, and a stator cooling device cooling the stator, the hybrid vehicle control method comprising:

detecting a temperature of the torque converter;

detecting a temperature of the rotor;

detecting a temperature of the stator;

controlling the engine, the transmission, the lockup clutch, the motor-generator and the stator cooling device based on the temperature of the torque converter detected, the temperature of the rotor detected and the temperature of the stator detected so that the temperature of the torque converter is equal to or lower than a first predetermined temperature, the temperature of the rotor is equal to or lower than a second predetermined temperature and the temperature of the stator is equal to or lower than a third predetermined temperature;

determining whether the temperature of the torque converter detected is higher than the first predetermined temperature;

determining whether the temperature of the rotor detected is higher than the second predetermined temperature; and determining whether the temperature of the stator detected is higher than the third predetermined temperature, wherein the controlling includes controlling the lockup clutch so that when it is determined that the temperature of the torque converter is equal to or lower than the first predetermined temperature and it is determined that the temperature of the rotor is higher than the second predetermined temperature, the lockup clutch is disconnected.

* * * * *